United States Patent
Sisalem et al.

(10) Patent No.: US 11,310,847 B2
(45) Date of Patent: Apr. 19, 2022

(54) MULTI-LAYERED DISTRIBUTED GTP-C PROCESSING

(71) Applicant: EMNIFY GMBH, Berlin (DE)

(72) Inventors: Dorgham Sisalem, Berlin (DE); Martin Giess, Schwarzach am Main (DE)

(73) Assignee: EMNIFY GMBH, Würzburg (DE)

( * ) Notice: Subject to any disclaimer, the term of this patent is extended or adjusted under 35 U.S.C. 154(b) by 0 days.

(21) Appl. No.: 17/426,787

(22) PCT Filed: Oct. 2, 2020

(86) PCT No.: PCT/EP2020/077641
§ 371 (c)(1),
(2) Date: Jul. 29, 2021

(87) PCT Pub. No.: WO2021/069322
PCT Pub. Date: Apr. 15, 2021

(65) Prior Publication Data
US 2022/0046732 A1 Feb. 10, 2022

(30) Foreign Application Priority Data

Oct. 9, 2019 (EP) .................................. 19202238

(51) Int. Cl.
*H04L 12/803* (2013.01)
*H04W 76/12* (2018.01)
(Continued)

(52) U.S. Cl.
CPC ........... *H04W 76/12* (2018.02); *H04L 47/125* (2013.01); *H04W 88/16* (2013.01)

(58) Field of Classification Search
CPC ...... H04W 76/12; H04W 88/16; H04L 47/125
See application file for complete search history.

(56) References Cited

U.S. PATENT DOCUMENTS

| 6,249,801 B1 | 6/2001 | Zisapel et al. |
| 7,020,090 B2 | 3/2006 | Chandwadkar et al. |

(Continued)

FOREIGN PATENT DOCUMENTS

CN 105792169 A 7/2016

OTHER PUBLICATIONS

International Search Report and Written Opinion in International Application No. PCT/EP2020/077641, dated Nov. 6, 2020 (13 pages).
(Continued)

*Primary Examiner* — Walli Z Butt
(74) *Attorney, Agent, or Firm* — Bookoff McAndrews, PLLC

(57) ABSTRACT

A method for multi-layered distributed GTP-processing for communication between user devices (2, 3) via a communication network (1), the network comprises clusters (4) each cluster (4) including gateways (7) and a loadbalancer (8), and a runtime database (5) storing load information of the gateways and a subscriber data-base (6) storing information on user preferences. The method comprises the loadbalancer (8), after receipt of a connection request, to choose the least loaded gateway (7), identifying if the cluster (4) is the preferred cluster of the user, and establishing, if the cluster is the preferred cluster, a connection between the user devices (2, 3) via the gateway (7) and in accordance with the user preferences or else, transmitting the connection request to the loadbalancer (8) of the preferred cluster (4), the loadbalancer identifying the least loaded gateway (7) in that cluster and establishing via the gateway (7) a connection between user devices by sending a response message in accordance with the user preferences to the first gateway in the first cluster.

14 Claims, 4 Drawing Sheets

Figure 1:
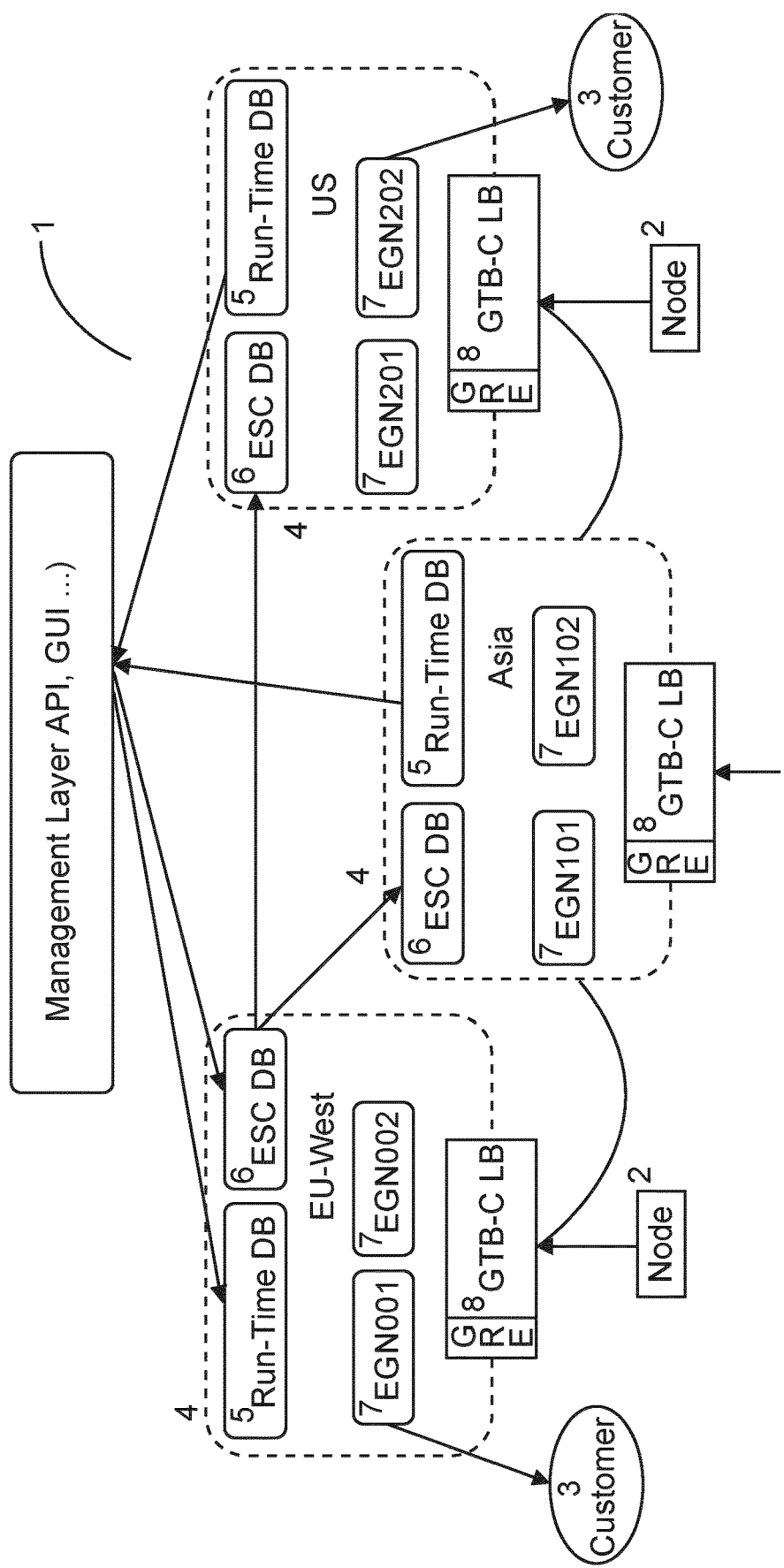

(51) Int. Cl.
 *H04L 47/125* (2022.01)
 *H04W 88/16* (2009.01)

(56) References Cited

U.S. PATENT DOCUMENTS

| | | | |
|---|---|---|---|
| 7,650,402 B1* | 1/2010 | Batz | H04L 67/1002 709/224 |
| 9,509,614 B2 | 11/2016 | Bosch et al. | |
| 2007/0165622 A1* | 7/2007 | O'Rourke | H04L 67/1002 370/389 |
| 2014/0379938 A1* | 12/2014 | Bosch | H04L 47/125 709/242 |

OTHER PUBLICATIONS

Extended European Search Report in European Patent Application No. 19202238.2, dated Mar. 31, 2020 (12 pages).
Decision to Grant in European Patent Application No. 19202238.2, dated Jul. 29, 2021 (2 pages).

* cited by examiner

MULTI-LAYERED DISTRIBUTED GTP-C PROCESSING

CROSS-REFERENCE TO RELATED APPLICATION(S)

This application is the U.S. national phase entry under 35 U.S.C. § 371 of International Application No. PCT/EP2020/077641, filed on Oct. 2, 2020, which claims priority to European Patent Application No. 19202238.2, filed on Oct. 9, 2019.

The invention relates to a telecommunication system and a corresponding method for data transmission between a user device and a public network via said telecommunication system. Moreover, the invention relates to routing data through a network, such as a cloud based network or any other network environment, that enables enterprises to connect to their nodes (user devices/mobile devices) and vice versa regardless of their location.

The usual scenario is for a node/user device to send data to the application server of an enterprise using a path that is determined by the network provider.

The telecommunication network will collect the traffic of all nodes belonging to an enterprise and then route it to the enterprise.

To ensure the highest quality and lowest delays, the telecommunication network provides its customers with a unique feature termed: Customer-Preferred Break Out. With this feature, the customer can indicate the geographic locations of his enterprise application servers. The telecommunication network will then route the customer's traffic over a high quality and low delay private network to the customer location. This has the major benefit of minimizing the exposure of the customer's traffic to the public internet.

BACKGROUND OF RELATED ART

From U.S. Pat. No. 7,020,090 B2 a method for load balancing in a network environment is known that includes receiving a request from an end user for a communication session at a central node. The method further includes identifying a selected one of a plurality of network nodes to facilitate the communication session for the end user based on feedback information provided by the selected network node. The feedback information is communicated from the selected network node and processed before making a decision to establish the communication session between the selected network node and the end user. The disclosure of U.S. Pat. No. 7,020,090 B2 does not propose a solution with respect to customer preferred breakout and does therefore not provide the flexibility and the multi-layered architecture of the present application.

U.S. Pat. No. 6,249,801 B1 relates to a method for load balancing requests in a network, the method including receiving a request from a requestor having a requestor network address at a first load balancer having a first load balancer network address, the request having a Source address indicating the requestor network address and a destination address indicating the first load balancer network address, forwarding the request from the first load balancer to a Second load balancer at a triangulation network address, the request Source address indicating the requestor network address and the destination address indicating the triangulation network address, the triangulation network address being associated with the first load balancer network address, and sending a response from the Second load balancer to the requestor at the requestor network address, the response having a Source address indicating the first load balancer network address associated with the triangulation network address and a destination address indicating the first requestor network address. However, the distribution of incoming requests from a first LB to a second one is decided by the first LB itself and is based on a static mapping table of the source IP address of the request and does not take into consideration user preferences.

U.S. Pat. No. 9,509,614 B2 relates to a method for load balancing in a network environment is provided and includes receiving a packet from a first stage load-balancer in a network environment, where the packet is forwarded from the first stage load-balancer to one of a plurality of second stage load-balancers in the network according to a hash based forwarding scheme, and routing the packet from the second stage load-balancer to one of a plurality of servers in the network according to a per-session routing scheme. The per-session routing scheme includes retrieving a session routing state from a distributed hash table in the network. In a specific embodiment, the hash based forwarding scheme includes equal cost multi path routing. The session routing state can include an association between a next hop for the packet and the packet's 5-tuple representing a session to which the packet belongs.

Unlike disclosure U.S. Pat. No. 9,509,614 the proposed application does not enforce a strict hierarchy of load balancers and the distribution from one layer to another is done by a member of a cluster and not the load balancers.

Problem to be Solved

The invention relates to a telecommunication network. This may be a mobile network operated by a mobile network operator (MNO), a mobile virtual network operated by a mobile virtual network operator (MVNO) or a mobile network operated by a mobile network enabler.

Typically, a mobile network operator owns and operates an access network and a mobile core network. The access network may be employed by a mobile device to connect to the mobile core network, wherein in a non-roaming case the access network, the subscriber identifier and subscription profile and the mobile core network are assigned to the same telecommunication network. The access network comprises infrastructure such as radio base stations in order to transmit and connect with a mobile core network. A mobile core network is the telecommunication network core part that offers services to customers. The mobile core network connects and routes data to public telecommunication networks, such as PTSN (public switched telephone network) or the public internet or other operators' mobile core networks. Thus, the key function of the mobile core network is to authenticate, authorize, and account a user device, to provide telecommunication services like voice, messages and data and provide the connectivity within the own network and to other public networks.

Usually a user device employs a so called "SIM card" in order to connect and authenticate telecommunication services with a mobile core network. The term "SIM card" relates to a universal integrated circuit card (UICC) which executes a subscriber identity module (SIM) application. The "SIM card" is typically issued by the home telecommunication network to a user. In this context the terms user, customer and subscriber will be used interchangeably. In principle, the SIM application serves to securely protect an international mobile subscriber identity (IMSI) number. Primarily, the IMSI number is a unique user specific number to identify a user. In practice, SIM cards are released by an MNO/MVNO together with a user specific IMSI number. Thus, the SIM card and the user specific number (IMSI) are assigned to a specific MNO/MVNO (the home telecommunication network).

A SIM card connects to a foreign mobile network, when not in the home network. Said foreign network is dependent on the roaming agreements of the home network operator with other mobile network operators. In the same manner, the services available when the SIM card is in a foreign (roaming) network depends on the network and the agreements the home network operator has with the foreign network. Especially in the case of a connection to a public network, such as the internet or an enterprise network, the owner of the SIM card has in general no control over which gateway is used to reach certain services. The connection can be, for example, established by the gateway of the foreign network directly or in the case the foreign network is a virtual network by the gateway of the core network associated with the virtual network operator the device is connected to or—which is the general case—the data is routed to the home mobile core network and the connection will be established by the gateway of the home network.

The present art has the disadvantage that the user has no control at which gateway the connection with the public network is established. This can lead to long exposure of the data in the public network, when the break-out (connection point to the public internet) is far away from the data target, for example an application server of the user at the headquarters.

SUMMARY OF THE INVENTION

The present invention overcomes this disadvantage by providing a virtual core network comprising a network of clusters which allows the user to choose where the connection to the public network is to be established.

In one aspect the invention provides a method for communication between a first user device and a second user device via a telecommunication network, the network comprising one or more clusters, each cluster comprising one or more gateways, a run-time database storing information on the load of the gateways, a subscriber database storing information on user preferences, the user preferences including information on the location of the second user device, and a load balancer, the method comprises the steps of receiving, at a first load balancer of the first cluster, a connection request from the first user device, sending, from the first load balancer, a request message to the first Runtime database of the first cluster, and receiving, at the load balancer, in response to said request message load information about all gateways, selecting the gateway having a load in compliance with a predetermined load criterion, transmitting, from the first load balancer, the connection request from the first user device to the selected gateway of the first cluster identifying, by the gateway, according to the subscriber database whether the first cluster is the preferred cluster for the second user device, if the first cluster is the preferred cluster of the second user device, establishing by the gateway a communication session between the first user device and the second user device by means of a request message and a response message and the user profile, if the first cluster is not the preferred cluster for the second user device, transmitting, from the gateway, the connection request to a second load balancer of a second cluster which is the preferred cluster for the second user device, sending, by the second load balancer, a request message to the Run-Time database of the second cluster, and receiving, at the second load balancer, a response message including the load information of the gateway of the second cluster, selecting by the second load balancer the gateway in the second cluster having a load in compliance with a predetermined load criterion, identifying, by the gateway, from the subscriber database the user profile and establishing a communication session by sending a response message to the first gateway in the first cluster. Preferably, the response message is then transmitted to a gateway of the foreign network.

In accordance with further aspect the invention provides a telecommunication network system comprising one or more clusters, each cluster comprising a load balancer, a run-time database, one or more gateways, and a subscriber database, a run-time database configured to store the load status of all gateways of the cluster, the load balancer configured to receive a connection request, to query the status of the gateways from the run-time database, to select a gateway in compliance with a load criterion, and to transmit the connection request to the identified gateway, a subscriber database configured to store information on user preferences, the user preferences including location information with respect to a second user device, the gateways configured to receive a connection request from the load balancer and to query the subscriber database whether the cluster is the preferred cluster and wherein, if the cluster is the preferred cluster, the gateway is configured to establish, by means of the request message and the subscriber profile, a communication session between a first user device and a second user device by sending a response message via the gateway to the first user device or, transmitting, if the cluster is not the preferred cluster, the connection request to a second load balancer of a second cluster which is the preferred cluster.

An advantage of the claimed invention is to ensure the highest quality and lowest delays; the telecommunication network provides its customers with a unique feature termed: Customer-Preferred Break Out. With this feature, the customer can indicate the geographic locations of his application servers. The network will then route the customer's traffic over a high quality and low delay network to the customer location. This has the major benefit of minimizing the exposure of the customer's traffic to the public internet. Further, in the case that the application server and mobile devices are in the same geographical region, the delay is minimized as well.

Another advantage of the present invention relates to a network with virtual world wide coverage and which seemingly frees the user of roaming agreements. A user purchasing a SIM card is dependent on roaming agreements between core network operators. Therefore, leaving the user in doubt whether he can access data services all over the world or even in neighbouring countries. The invention provides a network, which has its own agreements with several network operators and by that achieving optimal coverage.

In order to authenticate services, the user device transmits an authentication request including the IMSI to the mobile core network of the home telecommunication network operator that issued the SIM card via the access network of the visited telecommunication network operator. Within the mobile core network of the home network operator, the IMSI and user credentials of the user device are matched to a copy of the IMSI and user credentials stored in the HLR/HSS to identify whether and which services the user is allowed to use in the network of the visited network operator.

If it is found that services are allowed for the specific user, this information will be given to the access network and the user is allowed to use these services, e.g., voice, SMS and data in the visited access network including the corresponding access technology.

In one embodiment the invention relates to a telecommunication network of a mobile network operator or of a mobile virtual network operator. The network is divided into clusters operating independent from each other. Each cluster may be in a different region, for example north America, western Europe or southwest Asia. Each cluster contains
- one or more gateways, such as a Gateway GPRS support node (GGSN) or PDN Gateway (PGW), that process the data traffic of the customers and route it to the proper destination,
- a subscriber database containing information on the subscriber preferences or business agreements between the subscriber and the network operator affecting the data routing, the authorization of services and authentication of the user device,
- a run-time database monitoring the load on the gateways by monitoring the number of active PDP contexts, e.g., data connections, the average number of packets routed through this gateway, the CPU load or any other appropriate load criterion of each gateway;
- a load balancer, that has access to the information of the load distribution in the local cluster provided by the run-time database.

In the scope of this description any of these gateways, such as Gateway GPRS Support Node (GGSN) or a PGW or any other gateway capable of communicating with a public data network or packet data network is defined as an EGN. An EGN provides both GGSN as well as PGW capabilities.

The network, furthermore, can be accessed and monitored by means of an Application-Programming-Interface (API), which allows access to the components of the network and the information stored in the databases.

If a user device/node connects to a foreign access network, i.e. a radio access network (RAN), the access network transmits the authentication request to the foreign core network corresponding to the access network. The foreign core network processes the IMSI and authentication data sent by the user device in its VLR/HSS. The foreign core network identifies the home network the IMSI belongs to as the telecommunication network of this embodiment. The authentication request is transmitted to an access point of the identified telecommunication network.

In the next step the user device establishes a data connection, e.g., PDP context, to start sending traffic to its application server. The node will initiate the establishment of a PDP Context which will result in sending a control message, the connection request is a GTPv1 Create PDP Context Request or GTPv2 Create Default Bearer Request message, from the foreign network to the home telecommunication network. Using Anycast or shortest distance routing, the closest access, e.g., load balancer, to the telecommunication network can be chosen:
- Once received by the Load Balancer, the load balancer will choose based on its knowledge of the load of the local cluster of EGNs, which is maintained by the run-time database, the least loaded EGN.
- The chosen EGN will query the local subscriber database to check the subscriber requirements and preferred breakout region.
- In case the customer has indicated the breakout region to be the one in which the EGN is located then the EGN will reply to the customer's request and indicate in its response that this EGN should be used for all follow-up messages that belong to the same session. This EGN will then forward traffic from the node to the customer's application servers.
- In case the customer has indicated a different breakout region than the one in which the EGN is located in then the customer's request will be forwarded by the EGN to the load balancer responsible for that region.
- The Load Balancer in the remote region will choose based on its knowledge of the load of the local cluster of EGNs, as indicated by the runtime database, the least loaded EGN.
- The chosen EGN will query the local subscriber database to check the subscriber requirements.
- The EGN will reply to the customer's request and indicate in its response that this EGN should be used for all follow-up messages that belong to the same session. This EGN will then forward traffic from the node to the Customer's application servers. Data traffic can now start flowing from the node to the EGN.

In this embodiment the connection to the public network is established by a cluster of gateways in the region preferred by the user. This is called customer-preferred breakout—The customer can choose in which region the data is to be exposed to the public network. Thereby, if the customer chooses a breakout point in the same region in which the application server is located in, the customer minimizes the exposure to the public network.

In a preferred embodiment the operator of the telecommunication network is enabled to scale each region independently from one another. The operator is free in assigning the resources to a cluster. The operator is able to arbitrarily add or remove resources to clusters, thereby scaling the region in which the cluster operates.

In another preferred embodiment each customer has its own specific customer rules and policies in a preferred embodiment customer specific information are stored in a subscriber database.

In a preferred embodiment a foreign network, in particular an access network and the respective core network, resolves the "Access Point Name" of the telecommunication network to correspond to the telecommunication network's access point. The access point name is resolved by a DNS server to a load balancer of a cluster of EGNs.

In a further preferred embodiment the exposure of the customers' traffic to the internet is reduced, by routing the traffic over a high quality private network to the closest point, i.e. gateway, to the customer's servers.

In a further embodiment, using clusters in different regions enables the telecommunication network to deploy national policies such as lawful interception and privacy rules in each cluster based on the region it is located in.

In a further preferred embodiment the node/user device sends the connection request to a gateway of the foreign access network. The gateway then transmits the connection request to the load balancer of the telecommunication network.

In a further preferred embodiment the run-time database mirrors the load of each gateway and is updated by a gateway when a new PDP context is established.

In a preferred embodiment the load information of the gateway includes the number of active PDP contexts, average number of routed packets/sec and the CPU load.

In another preferred embodiment the run-time database is updated by a gateway when a new PDP context is established or terminated and/or after a predetermined time interval. When a gateway successfully establishes a new PDP context then the value entry representing said gateway will be incremented by 1. When a gateway terminates a PDP context then the entry representing said gateway in the runtime database will be decremented by 1. Further, each gateway updates in intervals of X seconds its own entry in the run-time database with the average number of packets routed through this gateway over the last X seconds as well as the CPU load.

In a further preferred embodiment the load balancer will decide on the appropriate gateway to use in compliance with a predetermined load criterion and for example choose the gateway with the lowest CPU load based on the information received from the run-time database. If multiple gateways have a similar CPU load, then out of those gateways choose the gateway with the lowest average number of routed IP packets/sec. If multiple gateways have similar CPU load and average number of routed IP packets/sec, then choose the gateway with the lowest active PDP contexts. If multiple gateways have similar CPU load, similar average number of routed IP packets/sec and similar number of active PDP contexts then chose one of these gateways randomly. A decision can be established based on any order of the above criteria, the order may depend on customer or operator preferences.

In a further embodiment the gateway in the second cluster will include its address in the response message to indicate to the serving gateway of the first network to which the first device is connected to that further communication should be conducted with this gateway directly without going through the first cluster.

In a further preferred embodiment a distributed multi-layer load balancing structure is established. Requests for establishing PDP contexts can arrive at any load balancer in any cluster and will still be forwarded to the cluster preferred by the customer.

In order to ensure interoperability with SGSN/SGW in the visited networks that only accept responses from the same IP address to which a request was sent to, the PGW/GGSN (EGN) will be configured to send responses with the public IP address of the load balancer over which the request was received from. As only the initial request will arrive over a load balancer, this approach applies only to the response to the initial request. This approach will ensure interoperability as well as reduce the load on the load balancer.

In case the customer did not specify a preferred breakout region then the gateway will choose itself for connecting the node/mobile device with the public internet or enterprise network In case the customer did not indicate a specific preferred breakout region but indicated its wish to use local breakout, then the gateway will route the request message to a cluster that is closest to the foreign network from which the request was received from.

DETAILED DESCRIPTION OF THE DRAWINGS

The invention will now be described, by way of example, with reference to the accompanying drawings:

FIG. 1 is a schematic illustration of the telecommunication network. The network comprises several clusters, which are controlled by an API. The nodes connect to the network via the load balancer and data is routed via an EGN to the customer or customer application server.

Figure 2:
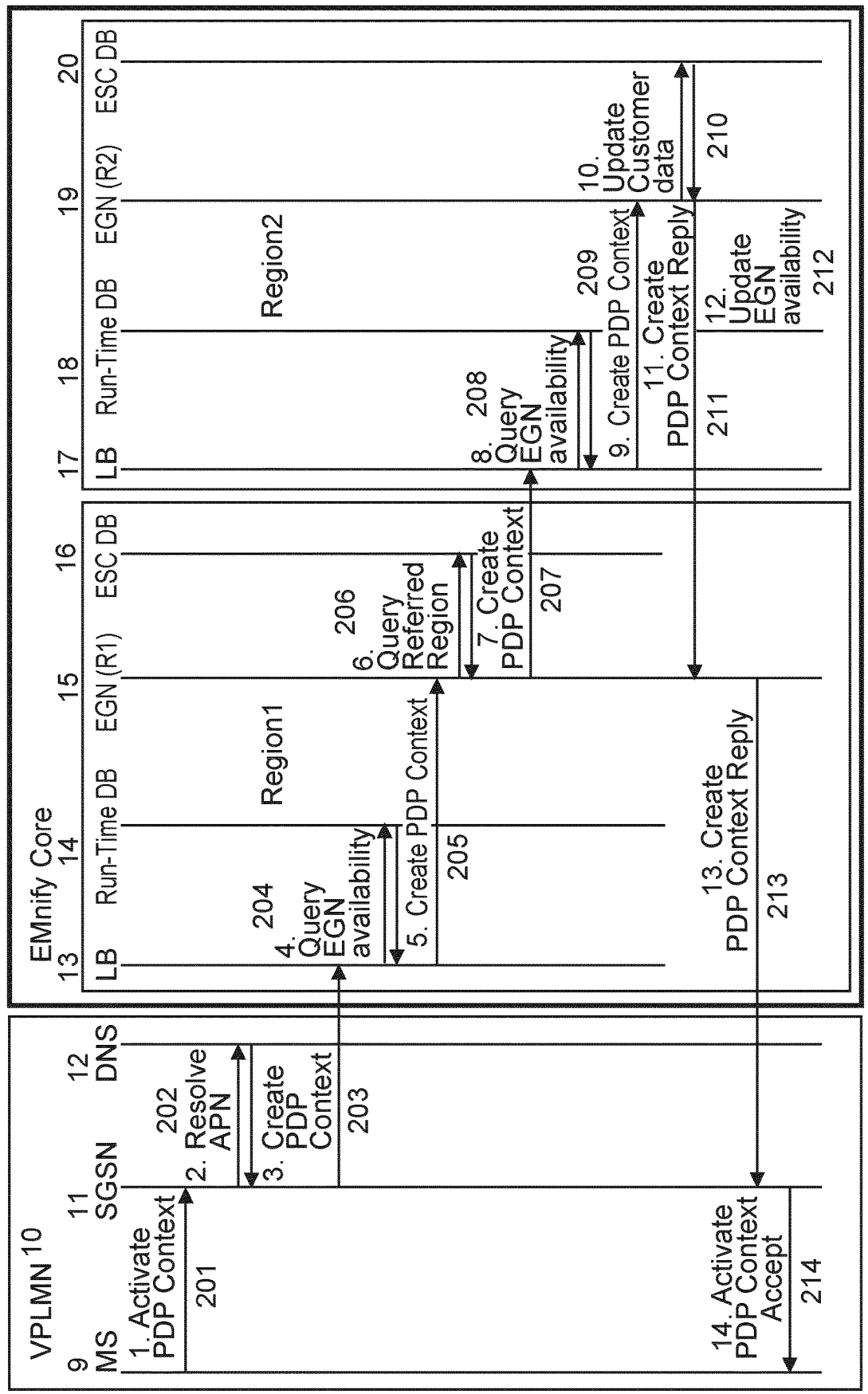

FIG. 2 is a schematic illustration of a PDP context establishment process for a user device/node connected to the telecommunication network by a 2G/3G connections. The user device establishing a PDP context, first connects to a cluster of the home telecommunication network. Based on customer preferences a second cluster is chosen and the gateway with the least load serves to establish the PDP context.

Figure 3:
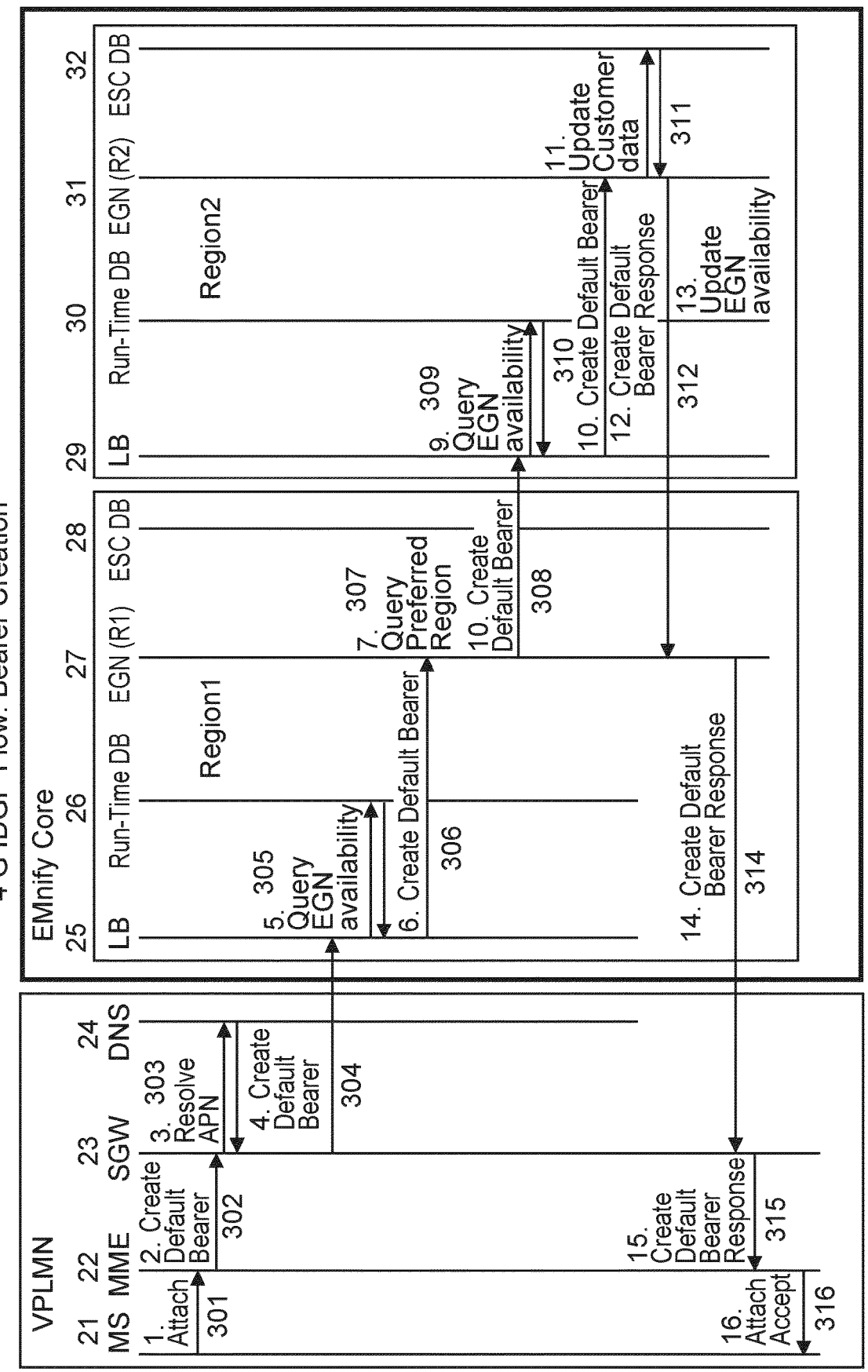

FIG. 3 is a schematic illustration of a PDP context establishment process for a user device/node connected to the telecommunication network by a 4G connection. The user device establishing a PDP context, first connects to a cluster of the home telecommunication network. Based on customer preferences a second cluster is chosen and the gateway with the least load serves to establish the PDP context.

Figure 4:
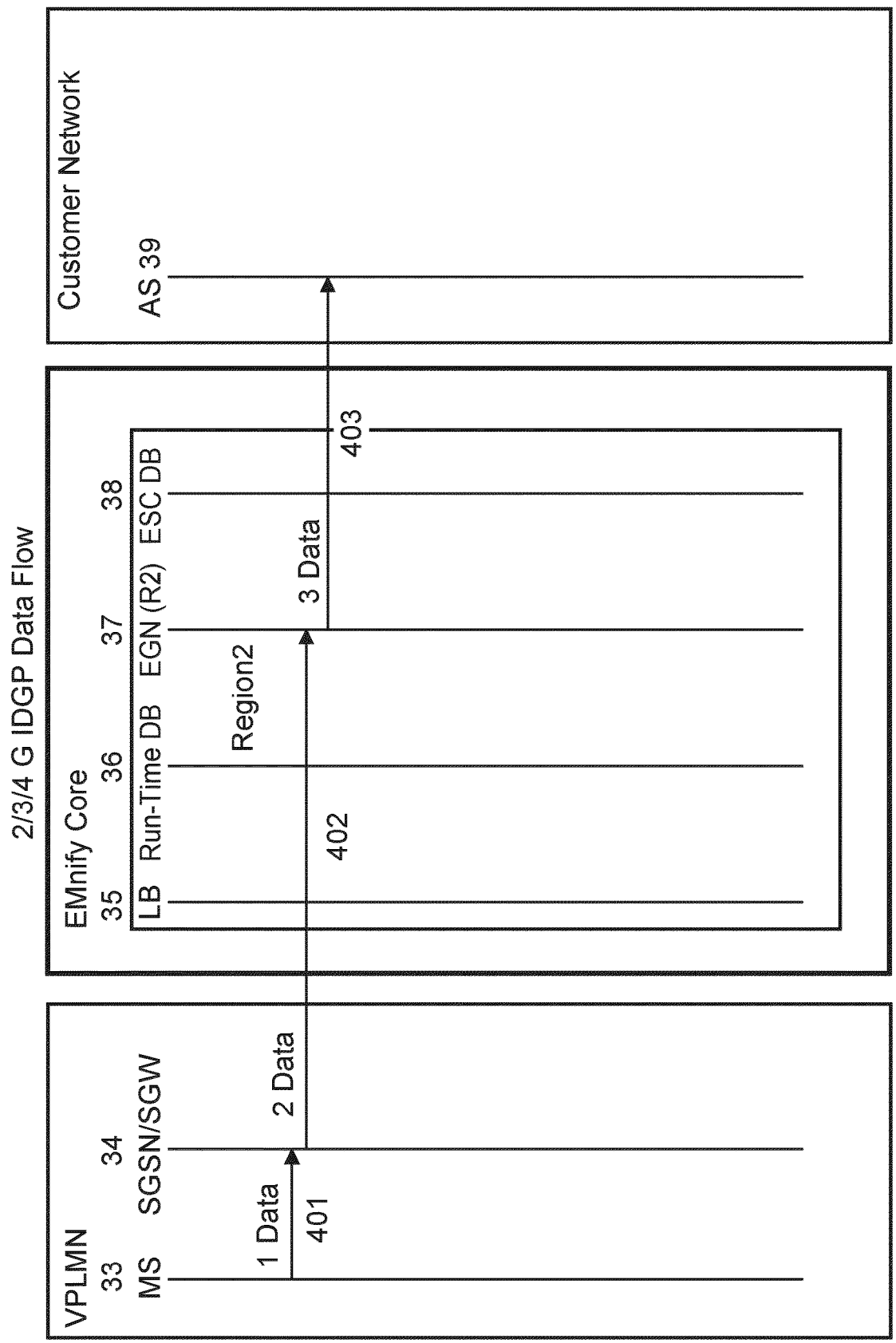

FIG. 4 illustrates the data flow in the case of a 2G/3G/4G connection after the PDP context has been established.

FIG. 1 describes the basic structure of telecommunication network 1. In the usual scenario a user device containing a SIM card including an IMSI registered with the telecommunication network, subsequently called a node 2, wants to send data to an application server of an enterprise 3. As the node can be anywhere in the world it is an objective of telecommunication network 1 to collect the traffic of all nodes 2 belonging to an enterprise and then route it to the enterprise. The telecommunication network further comprises several clusters 4, the clusters may be for example located in the U.S., in western Europe, and in southeast Asia. Each cluster contains a run-time database 5, a subscriber database 6, at least one gateway 7 and a load balancer 8. The run-time database 5 monitors the load of each gateway, this may be for example the number of active PDP contexts, the number of packets routed by the gateway, and/or the CPU load. The subscriber database 6 contains customer preferences, as for example the geographic location of his application servers, the region he wants to operate in, or his wish to use local routing if possible, or information regarding bandwidth or cost agreements and the core networks to be used depending on business agreements. In case a customer profile changes then the changes can be mirrored in all subscriber databases in all clusters. Depending on the connection type, for example 2G/3G or 4G the gateway 7 may be a gateway GPRS support node (GGSN) or an PDN-gateway (P-GW), respectively. The load balancer 8 receives all signalling messages directed to the corresponding cluster and routes the messages to the gateway with the least load.

FIG. 2 shows the PDP context creation in the case of 2G/3G. The node 9 is (roaming) in a foreign network (visited public land mobile network VPLMN). After authentication and authorisation with the telecommunication network 1 in a standard attach procedure, the node 9 creates a PDP context to transfer data. For details of the attach procedure and the establishment of a PDP context it is referred to TS 29.060 version 11.9.0 Release 11 of the 3rd Generation Partnership Project, which is hereby incorporated by reference in its entirety.

In step 201 the node sends an activate PDP context message to the serving GPRS support gateway (SSGN) 11 of the VLPMN 10. The PDP context message includes the APN of the telecommunication network.

In step 202 the SSGN queries a DNS server 12 to resolve the APN corresponding to the telecommunication network. The SSGN sends the APN and receives the IP address corresponding to a load balancer 13 of the telecommunication network.

In step 203 the SSGN 11 then sends a create PDP context message to the load balancer 13 resolved by the APN.

In step 204 the load balancer queries the run-time database 14 to establish which GGSN has the load in compliance with a predetermined load criterion. Depending on the number of active PDP contexts, the number of processed PDP packets and the CPU load the load balancer selects the GGSN with the least load.

In step 205 the load balancer 13 forwards the create PDP context request message to the chosen GGSN 15. The forwarded request contains the address of the SSGN 11 as the source address and uses the GGSN address as the destination address.

In step 206 upon reception of the create PDP context message the GGSN 15 queries the subscriber database 16 using the IMSI indicated in the create PDP context request. The result of this query is the subscriber profile. The subscriber profile contains information including the location of the customer's application server and from which cluster/region the customer wants to connect to the internet, e.g., the breakout region, or whether the customer prefers local breakout. Further, the customer information include traffic characteristics (max bandwidth to use), how to secure the traffic (for example VPN or not at all), a monthly data limit, for example how much data a node is allowed to send per month, amount of credit the customer has, a quality of service profile, an IP-blacklist, specifying addresses the node is not allowed to connect to, an IP whitelist, specifying addresses the node is allowed to connect to, information on a security gateway, specifying which VPN server is the intended VPN server.

In the next step 207 the GGSN 15 will conduct the following steps:
  If a region or a cluster is chosen, then forward the create PDP context request to the load balancer 17 of the chosen region/cluster.
  If local breakout is chosen, then forward the create PDP context request to the load balancer 17 of the cluster closest to the foreign network from which the request was received.
  If no region was chosen and local breakout was not indicated, the request will not be forwarded and the GGSN will continue with step 211.

In step 208 the load balancer 17 in the chosen region queries the run-time database 18. The result of the query is the least loaded GGSN 19 of the cluster the load balancer 17 is located in.

In step 209 the load balancer 17 will forward the create PDP context request to the chosen GGSN 19. The request will keep the address of the sending GGSN 15 as the source address and use the address of the chosen GGSN 19 in the preferred cluster as the destination address.

In step 210 upon reception of the create PDP context request the GGSN 19 queries the subscriber database 20 using the IMSI indicated in the request. The result of the query is the subscriber profile which indicates the policies that should be enforced on the customer's traffic such as threshold and rate limits.

In step 211 if the PDP Context creation request complies with the subscriber's policies then the GGSN will accept the creation request by sending a "Create PDP Context reply". As part of the reply, the GGSN will indicate that further signalling messages and data should be sent directly to this GGSN. If the GGSN is not located in cluster at which the request was originally received, then the reply will be sent to the GGSN 15 from which the request was received.

In step 212 the GGSN updates the run-time database to indicate the updated count of PDP contexts processed by the GGSN.

In step 213 the GGSN 15 will send the reply to the SSGN 11 to which the node/user device is attached to. GGSN 15 will use the public IP address of the Load balancer of the cluster in which the GGSN 15 is located in as the source IP address.

In step 214 the SSGN 11 sends activate PDP context Accept message to the node/user device indicating the successful creation of the PDP context.

FIG. 3 shows the data path (bearer) creation in the case of 4G. In this case the creation procedure is combined with the attach procedure of the node/user device. That is, beside the authentication and location management phases, the Attach request will also trigger the MME (Mobility Management Entity) to initiate a bearer creation phase. Once the Serving Packet Gateway (S-GW) receives the Create Bearer Request, the message flow for establishing a data path resembles the flow described for 2G/3G but with the exception that GTP-C v2 messages are used. The EMnify EGN acts as a GGSN or PGW depending on the version of the received GTP-C message.

The difference can be seen in additional step 302, after the MME 22 has received an attach request it is the MME 22 sending a Create default bearer request message to the serving Gateway (S-GW) 23. Besides this difference the create default bearer request message corresponds to the create PDP context request and the create default bearer response message corresponds to the create PDP context reply message as used in 2G/3G.

The PDP context creation in the case of 4G has the following steps:
  In step 301 a first user device sends an attach request to the MME 22 in the foreign network.
  In step 302 the MME then sends a create bearer request to the SGW in the same foreign network.
  In step 303 the MME 22 queries a DNS server 24 to resolve the APN transmitted in the create bearer request and receives an IP-address of a load balancer of a cluster of the home telecommunication network.
  In step 304 the MME 22 transmits the create bearer request to the load balancer 25.
  In step 305 the load balancer queries the run-time database 26 to establish which PGW has a load in compliance with a predetermined criterion. Depending on the number of active PDP contexts, the number of processed PDP packets and the CPU load, the load balancer selects the PGW in compliance with the load criterion.
  In step 306 the load balancer forwards the create default bearer request message to the chosen PGW 27. The forwarded request contains the address of the SGW 23 as the source address and uses the PGW address as the destination address.
  In step 307 upon reception of the create default bearer message the PGW 27 queries the subscriber database 28 using the IMSI indicated in the create default bearer request. The result of this query is the subscriber profile. The subscriber profile contains information including the location of the customer's application server and from which cluster/region the customer wants to connect to the internet, e.g., the breakout region, or whether the customer prefers local breakout. Further the customer information include traffic characteristics (max bandwidth to use), how to secure the traffic (for example VPN or not at all), a monthly data limit, for example how much data a node is allowed to send per month, amount of credit the customer has, a quality of service profile, an IP-blacklist, specifying addresses the node is not allowed to connect to, an IP whitelist, specifying addresses the node is allowed to connect to, information on a security gateway, specifying which VPN server is the intended VPN server.

In the next step 308 the PGW 27 will conduct the following steps:
  If a region or a cluster is chosen, then forward the create default bearer request to the load balancer 29 of the chosen region/cluster.
  If local breakout is chosen, then forward the create default bearer request to the load balancer 29 of the cluster closest to the foreign network from which the request was received.
  If no region was chosen and local breakout was not indicated, the request will not be forwarded and the PGW 27 will continue with step 312.

In step 309 the load balancer 29 in the preferred region queries the run-time database 30. The result of the query is the least loaded PGW 31 of the cluster the load balancer 29 is located in.

In step 310 the load balancer 29 will forward the create default bearer request to the chosen PGW 31. The request will keep the address of the sending PGW 27 as the source address and use the address of the chosen PGW 31 of the preferred cluster as the destination address.

In step 311 upon reception of the create default bearer request the PGW 31 queries the subscriber database 32 using the IMSI indicated in the request. The result of the query is the subscriber profile which indicates the policies that should be enforced on the customer's traffic such as threshold and rate limits.

In step 312 if the create default bearer request complies with the subscriber's policies then the PGW will accept the creation request by sending create default bearer response. As part of the reply, the PGW will indicate that further signalling messages and data should be sent directly to this PGW. If the PGW is not located in cluster at which the request was originally received, e.g., is not PGW 27, then the reply will be sent to the PGW 27 from which the request was received.

In step 313 the PGW sends an update message to the run-time database 30 to indicate the update count of PDP contexts processed by the PGW.

In step 314 the PGW 27 will send the reply to the SGW 23 to which the node/user device is attached to. PGW 27 will use the public IP address of the Load balancer of the cluster in which the PGW 27 is located in as the source IP address.

In step 315 the SGW 23 sends a create default bearer response message to the MME.

In step 316 the MME 22 sends an attach accept to the first user device establishing the PDP context.

FIG. 4 shows the data flow after the PDP context has been established. The node/user device sends data to the Serving Gateway (SGSN/SGW) it is attached to, step 401.

In the next step 402 the SGSN/SGW encapsulates the traffic into a GTP-U tunnel and sends the traffic to the EGN 37 of the preferred cluster. The address of EGN 37 was communicated to the SGSN in the "create PDP context reply"/"Create Default bearer response" of steps 211, 213 and steps 312, 314, respectively. The dataflow is now directly between the SGSN/SGW 11/23 and the GGSN/PGW of the chosen cluster.

In the last step 403 of FIG. 4 the GGSN/PGW will decapsulate the traffic and send it to the final destination, e.g. the application server in the customer premise.

The invention claimed is:

1. A method for communication between a first user device and a second user device via a telecommunication network, the network comprising two or more clusters, each cluster comprising
  one or more gateways;
  a run-time database storing information on the load of the gateways,
  a subscriber database storing information on user profiles associated to the first user device, the user profiles including information on the location of the second user device; and
  a load balancer;
the method comprising the following steps:
  receiving, at a load balancer of a first cluster of the two or more clusters, a connection request from the first user device;
  sending, from the load balancer of the first cluster, a request message to a Runtime database of the first cluster; and
  receiving, at the load balancer, in response to said request message load information about all gateways;
  selecting by the load balancer a gateway of the first cluster having a load in compliance with a predetermined load criterion;
  transmitting, from the first load balancer, the connection request from the first user device to the selected gateway of the first cluster
  querying, by the gateway, the subscriber database for the user profile using an international mobile subscriber identity, IMSI, associated with the first user device;
  identifying, by the gateway, according to the user profile whether the first cluster is the preferred cluster for the second user device;
  if the first cluster is the preferred cluster of the second user device, establishing by the gateway a communication session between the first user device and the second user device by means of a response message to the gateway to which the first user device is connected and the user profile;
  if the first cluster is not the preferred cluster for the second user device, transmitting, from the gateway, the connection request to a load balancer of a second cluster of the two or more clusters which is the preferred cluster for the second user device;
  sending, by the load balancer of the second cluster, a request message to the Run-Time database of the second cluster; and
  receiving, at the load balancer of the second cluster, a response message from the run-time database of the second cluster including the load information of the gateway of the second cluster;
  selecting by the load balancer of the second cluster a gateway in the second cluster having a load in compliance with a predetermined load criterion;
  transmitting, from the load balancer of the second cluster, the connection request from the first user device to the selected gateway of the second cluster
  querying, by the gateway, the subscriber database for the user profile using an international mobile subscriber identity, IMSI, number, associated with the first user device;
  identifying, by the gateway, according to the subscriber database whether the connection request complies with the user profile and establishing by the gateway a communication session between the first user device and the second user device by sending a response message to the gateway in the first cluster.

2. The method of claim 1, wherein the connection request is a GTPv1 Packet Data Protocol, PDP, context request or GTPv2, Create Session Request message.

3. The method of claim 1, wherein the load criterion is one out of the number of active PDP context, average number of routed packets/sec, and the CPU load.

4. The method of claim 1, further comprising determining, by the load balancer, the gateway in compliance with more than one predetermined load criteria.

5. The method of claim 1, further comprising
updating, by a gateway, the run-time database when a new PDP context is established or terminated and/or after a predetermined time interval,
the updating comprises:
incrementing the value entry representing the gateway by 1, when the gateway successfully establishes a new PDP context; and
decrementing the value entry representing the gateway by 1, when the gateway terminates a PDP context; and
further, updating by each gateway in intervals of X seconds its own entry in the run-time database with the average number of packets routed through this gateway over the last X seconds as well as the CPU load.

6. The method of claim 1, further comprising
deciding, by the load balancer, based on the information received from the run-time database, on the appropriate gateway to use and choosing the gateway with the lowest CPU load, or
if multiple gateways have a similar CPU load, then out of those gateways choosing the gateway with the lowest average number of routed IP packets/sec, or
if multiple gateways have similar CPU load and average number of routed IP packets/sec, then choosing the gateway with the lowest active PDP contexts, or
if multiple gateways have similar CPU load, similar average number of routed IP packets/sec and similar number of active PDP contexts then choosing one of these gateways randomly.

7. The method of claim 1, further comprising
including, by the gateway at which the PDP context is established, the gateway's address in the response message to indicate to the serving gateway of the first network to which the first device is connected that further communication should be conducted with this gateway directly.

8. The method of claim 1, wherein each customer has its own specific customer rules and policies stored in the subscriber database, the method further comprising managing and updating the subscriber database centrally, and updating the subscriber databases in all clusters, once the central subscriber database is updated.

9. The method of claim 1, further comprising
choosing, by the gateway, itself for
connecting the node/mobile device with the public internet or enterprise network if the customer did not specify a preferred breakout region.

10. The method of claim 1, further comprising
routing, by the gateway,
the request message to a cluster that is closest to the foreign network from which the request was received from, if the customer indicated to use local breakout.

11. The method of claim 1,
wherein requests for establishing PDP contexts can arrive at any load balancer in any cluster and will still be forwarded to the cluster preferred by the customer.

12. A telecommunication network system comprising:
two or more clusters; each cluster comprising: a load balancer, a run-time database, one or more gateways, and a subscriber database;
the run-time database configured to store the load status of all gateways of the two or more clusters;
the load balancer configured to receive a connection request from a first user device, to query the status of the gateways from the run-time database, to select a gateway in compliance with a load criterion, and to transmit the connection request to the identified gateway;
the subscriber database configured to store information on user profiles including information on the location of second user device
the gateways configured to receive a connection request from the load balancer and to query the subscriber database for a user profile an international mobile subscriber identity, IMSI, associated with a user device and identifying whether a first cluster of the two or more clusters is a preferred cluster in accordance with the user profile and wherein, if the first cluster is the preferred cluster, the gateway is configured to establish, by means of the request message and the user profile, a communication session between the first user device and the second user device by sending a response message via the gateway to the first user device and transmitting, if the first cluster is not the preferred cluster, the connection request to a second load balancer of a second cluster of the two or more clusters which is the preferred cluster.

13. The system of claim 12, wherein the system comprises input means for enabling an operator to arbitrarily add or remove resources to each cluster.

14. The system of claim 12, wherein the gateway is GW/GGSN, and wherein the gateway is configured to send responses with the public IP address of the load balancer over which the connection request was received from.

* * * * *